United States Patent
Pfeiffer

Patent Number: 6,049,962
Date of Patent: Apr. 18, 2000

[54] PROCESS FOR CONNECTING A PIPE WITH A PRESS FITTING AND COMBINATION OF PRESS FITTING, PIPE AND PRESSING DEVICE FOR IMPLEMENTING SAID PROCESS

[75] Inventor: Heinrich Pfeiffer, Kaarst, Germany

[73] Assignee: Novopress GmbH Pressen und Presswerkzeuge & Co., KG, Germany

[21] Appl. No.: 09/068,160

[22] PCT Filed: Oct. 30, 1996

[86] PCT No.: PCT/EP96/04719

§ 371 Date: May 4, 1998

§ 102(e) Date: May 4, 1998

[87] PCT Pub. No.: WO97/17563

PCT Pub. Date: May 15, 1997

[30] Foreign Application Priority Data

Nov. 4, 1995 [DE] Germany ............... 195 41 216

[51] Int. Cl.[7] .................... B21D 39/00; B23P 11/00
[52] U.S. Cl. .................... 29/515; 29/516; 29/283.5; 285/382.2
[58] Field of Search ............ 29/515, 516, 283.5; 285/382.2, 382.1, 374

[56] References Cited

U.S. PATENT DOCUMENTS

| | | | |
|---|---|---|---|
| 3,149,861 | 9/1964 | Larsson | 285/382.2 |
| 3,803,897 | 4/1974 | Ridenour et al. | 29/516 |
| 4,371,199 | 2/1983 | Kushner et al. | 285/382.2 |
| 5,007,667 | 4/1991 | Unewisse et al. | 285/382.2 |
| 5,121,625 | 6/1992 | Unewisse et al. | 29/237 |
| 5,148,698 | 9/1992 | Dischler | 72/410 |
| 5,150,519 | 9/1992 | Unewisse | 29/890.14 |
| 5,484,174 | 1/1996 | Gotoh et al. | 285/382.2 |

FOREIGN PATENT DOCUMENTS

| | | | |
|---|---|---|---|
| 0228466 | 10/1985 | Denmark | 29/516 |
| 0241637 | 12/1986 | Denmark | 285/382.2 |
| 0361630 | 4/1990 | European Pat. Off. | |
| 0451806 | 4/1991 | European Pat. Off. | |
| 0507423 | 3/1992 | European Pat. Off. | |
| 1187870 | 10/1965 | Germany | |
| 2516537 | 2/1976 | Germany | |
| 2719882 | 11/1978 | Germany | 285/382.2 |
| 2725280 | 12/1978 | Germany | 285/382.2 |
| 000470680 | 2/1992 | Germany | 285/382.2 |
| 4025317 | 2/1992 | Germany | |

OTHER PUBLICATIONS

German Patent Appl. No. 9216369 U, Mar. 18, 1983.
Brochure Regarding the Viegener Profipress Press–Fitting, Date Unknown, 13 pages.

*Primary Examiner*—David P. Bryant
*Assistant Examiner*—Jermie E. Cozart
*Attorney, Agent, or Firm*—Liniak, Berenato, Longacre & White, LLC

[57] ABSTRACT

In a process, a pipe (1) is connected to a press fitting (2) which has a cylindrical section (3) and a radially outward-projecting annular bead (5) at each end which, at the free end of the press fitting (2) has an inwardly directed bead shoulder (8) and internally forms an annular groove (10) in which is fitted a sealing ring (11). In order to make the connection, the press fitting (2) and the pipe (1) are inserted one into the other and the annular bead (5) and the cylindrical section (3) are pressed radially inwards with the plastic deformation of the pipe (1) as well. This is done by pressing the bead shoulder (8) into the pipe (1) to form a first narrowing (44), and a second narrowing (43) is formed in the pipe by pressing the cylindrical section (3) at a distance from the first narrowing (44) such that the shaping of the second narrowing (43) is separated from the first (44) In such a way that the first narrowing (44) has a radially outwardly projecting section (47) towards the second.

36 Claims, 3 Drawing Sheets

PROCESS FOR CONNECTING A PIPE WITH A PRESS FITTING AND COMBINATION OF PRESS FITTING, PIPE AND PRESSING DEVICE FOR IMPLEMENTING SAID PROCESS

The invention concerns a method for joining a pipe with a press fitting that has a cylindrical section and, at each end, a radially outwardly projecting annular bead which has, toward the free end of the press fitting, a bead shoulder directed radially inward and on the inside forms an annular groove into which a sealing ring is placed, such that to produce the joint, the press fitting and pipe are slid one into another and then the annular bead and the cylindrical section are pressed radially inward accompanied by plastic deformation of the pipe as well. The invention further refers to a combination of press fitting, pipe, and pressing device for carrying out said method, the press fitting and pipe being slid one into another and the press fitting having a cylindrical section and, at each end, an annular bead projecting radially outward and having, toward the free end, a bead shoulder directed radially inward and a sealing ring which is placed on the inside into the annular groove there; and the pressing device having multiple pressing jaws with an internal pressing contour which constitutes a pressing region, running in the circumferential direction, for acting upon the annular bead, and a pressing land running at a distance therefrom and projecting radially inward. Lastly, the invention is directed toward a pressing device of the aforesaid kind.

For the joining of pipes, it is known to use sleeve-shaped press fittings which are made of metal, preferably of steel. In order to produce the pipe joint, the press fittings are slid over the pipe end and then compressed radially, both the press fitting and the pipe being plastically deformed.

DE-C-1 187 870 discloses a press fitting which has a cylindrical section and is equipped at each end with an annular bead which projects radially outward. On the inside, the two annular beads form annular grooves into which a sealing ring is placed. The annular beads each terminate, toward the free end, in a bead shoulder oriented radially inward, which is pointed at the inner edge like a blade. With this press fitting, the inside diameter of the cylindrical section in the unpressed state is somewhat greater than the outside diameter of the pipes to be joined. The diameter of the cutting edges of the bead shoulders is—again in the unpressed state—less than the inside diameter of the cylindrical section in one case, and in the other case is identical to it. In both cases, radial pressing takes place in such a way that the respective cutting edge is pushed into the relevant pipe, forming a constriction with plastic deformation. The cylindrical section of the press fittings is compressed only to the point that its inner surface comes into contact against the outer surface of the pipe, without deforming the pipe.

This type of joint between pipe end and press fitting has proven disadvantageous for several reasons. Pushing the cutting edges into the pipe end regions results in the creation of high notch stresses in the pipe end regions, which can lead to breaks in this region and thus to leaks. Moreover, the joint is not suitable for higher pressures. In addition, sealing is jeopardized by the sealing rings, since the pipe regions located opposite the sealing rings are moved away from the sealing rings by the constrictions, thus reducing sealing areas.

A transition has recently been made to press fittings such as those indicated by EP-B-0 361 630, DE-A-40 25 317, U.S. Pat. No. 5,007,667, and DE-U-92 16 369.6. They have a cylindrical section which is constricted in the center region, so that stops for the pipe ends are formed there on the inside. In the respective regions adjacent thereto on the outside, the cylindrical section has, in the unpressed state, an inside diameter which is slightly greater than the outside diameter of the pipes to be joined, so that tolerances can be compensated for. The annular beads on the ends of the press fitting have oblique bead flanks, proceeding from the cylindrical section, which transition into curved sections and then into the bead shoulders directed inward. The inner rims of the bead shoulders are not—as in the case of the press fitting defined by DE-C-1 187 870—pointed, and have a diameter which is greater than the inside diameter of the respective regions of the cylindrical section adjacent to the annular beads, so that in the unpressed state the bead shoulders are at a distance from the slid-in pipe ends. This is intended to ensure an unimpeded pressing travel for the bead shoulder, and thus help eliminate any hindrance to plastic deformation of the annular bead (EP-B-0 361 360).

Pressing of the press fitting and of the pipe is accomplished by means of pressing devices such as those known in a variety of embodiments, for example from EP-A-0 451 806 and furthermore from EP-B-0 361 630 and DE-U-92 16 369.6. The pressing devices have two or more pressing jaws which, during the pressing operation, can be moved radially inward until they form a closed pressing space. As shown in particular by the last two of the aforementioned documents, the pressing jaws have on the inside a pressing contour with a annular pressing groove running in the circumferential direction. The annular pressing groove is intended to act on the annular bead during the pressing operation. Additionally formed by the pressing contour are radially inwardly projecting pressing lands, the spacings of which from the annular pressing groove are such that when the pressing device is applied, a pressing land comes to rest against the cylindrical section directly behind the annular groove.

During the pressing operation, the pressing jaws are brought together by means of a corresponding drive. As a result, the annular bead is pushed radially inward by the annular groove, and simultaneously the immediately adjacent region of the cylindrical section is pushed radially inward by the pressing land, accompanied by plastic deformation. As a result, the pipe is also deformed radially inward in this region, forming a single constriction. In this context, a "constriction" is to be understood as a deformation of the pipe such that the pipe wall is offset radially inward on the outside and inside. It does not need to extend over the entire circumference of the pipe, but rather can be divided into multiple sections distributed over the circumference, i.e. the depth of the constriction can fluctuate between zero and a maximum value.

The nature and extent of the constriction depend on the particular pressing contour selected for the pressing jaws. For example, in the case of pressing as defined by U.S. Pat. No. 5,007,667, the constriction is confined to the region behind the annular bead, a comparatively deep constriction being provided. In the case of pressing as defined in DE-A-40 25 317, an elongated, very flat constriction is realized by acting on the one hand on the annular bead and on the other hand behind it at a distance therefrom, said constriction extending over almost the entire width of the pressing jaws.

As regards the annular bead itself, pressing as defined in EP-B-0 361 630 and U.S. Pat. No. 5,007,667 also aims to achieve a deformation, the annular bead being crimped not only radially but also axially in order to achieve a greater elastic preload on the sealing ring. In the case of pressing as defined in EP-B-0 361 630, the annular bead radially follows the deformation of the pipe only to the point that the sealing ring is pressed onto the pipe to an extent sufficient for the sealing effect. Contact between the inner rim of the bead shoulder and the pipe is avoided, so as not to impede deformation of the annular bead and not jeopardize the sealing effect of the sealing ring. In the case of pressing as defined in U.S. Pat. No. 5,007,667, the annular bead is deformed in such a way that the bead shoulder becomes skewed. As a result, during the last phase of pressing the bead shoulder comes into contact with its sharp inner edge against the outside of the pipe and digs slightly into the pipe, but a constriction is not shaped into the pipe.

The pressing device as defined in EP-B-0 361 630 has a pressing land on either side of the annular groove, i.e. the pressing contour is symmetrical in cross section. The symmetrical arrangement of a second pressing land is not in itself necessary for pressing to function, but the position in which the pressing device is applied onto the location being pressed is thereby made immaterial. In practice, however, it has been found that the symmetrical configuration of the pressing contour causes the second pressing land, which is actually unnecessary for the particular pressing, to come into contact against the pipe during the final phase of the pressing operation and result in a constriction of the pipe there (page 2 of DE-U-92 16 369.6). This not only increases the pressing forces to be exerted but also decreases the elastic preload of the sealing ring, with the risk that leaks might occur. The last-named document therefore proposes deviating from the symmetrical pressing contour and providing only a single pressing land to form the constriction.

EP-B-0 361 630 furthermore proposes pressing two or even more constrictions next to one another into the cylindrical section of the press fitting, in order to improve the clamping effect between press fitting and pipe. This can be accomplished, according to this document, by the fact that after the first pressing operation, the pressing device is applied again in such a way that the one pressing land comes to rest in the constriction that has already been indented, so that the other pressing land can indent a further constriction on the side of the first constriction away from the annular bead. An alternative possibility envisioned is to widen the pressing jaws on one side in the axial direction, and to provide there at least one further pressing land, arranged separated by a cylindrical region, which has the advantage that two or more constrictions can be indented in a single pressing operation. In this case, the pressing land on the other side of the pressing groove is to be omitted.

The method described above has not come into use, since production press fittings have cylindrical sections with an axial extension that is too short for the provision of multiple constrictions at a spacing such that separate constrictions occur in the pipe as well. If the spacing between the pressings is too small, what forms in each case in the pipe is only a single, elongated constriction which does not produce any improvement in strength. Also disadvantageous is the fact that a standard pressing device must be applied several times in order to carry out this method; this takes time, requires great care, and is often not even possible for space reasons. If the pressing device is modified as described above, i.e. equipped with multiple pressing lands on one side of the pressing groove, the result is a very bulky, heavy pressing device which for space reasons cannot always be used, and which moreover requires high drive forces in order to bring the pressing jaws together.

DE-A-27 19 882 proposes a press fitting for joining pipes in which, in the unpressed state, the annular bead extends cylindrically. Placed into the annular groove of the annular bead is an elastic sealing ring which has set into it, toward the open side of the annular bead, a reinforcing ring made of metal or high-strength plastic. A pressing tool split in the axial direction is used for pressing; the pressing jaws of the single pressing tool indent a constriction, divided into multiple sections, into the press fitting and into the pipe behind the annular bead. As a result, the outer section of the annular bead is bent over inward, the reinforcing rings ensuring that the sealing ring is not pushed out. As the annular bead is deformed, the sealing ring together with the reinforcing ring is compressed with sufficient force to create an annular constriction in the pipe in the region of the sealing ring. The sealing ring is severely compressed as a result. Pressing occurs in such a way as to prevent the bent-over bead shoulder from pushing into the wall of the pipe.

It is also proposed, in EP-B-0 361 630 and U.S. Pat. No. 5,007,667, that radial pressing not be carried out uniformly over the circumference, but rather that the pressing lands be recessed in the regions of the end surfaces of the pressing jaws, so that with two pressing jaws, a lemon-shaped constriction is produced. Polygonal constriction contours are also mentioned.

Pipe joints have hitherto been produced by means of press fittings only for the low-pressure range up to 16 bar. In addition, it was also necessary hitherto to use special pipes with restricted tolerances in order to ensure a secure joint between press fitting and pipe end region. As EP-B-0 361 630 shows, it is desirable to use this type of pipe joint for higher pressures as well, and/or to use standard pipes without a restricted tolerance range. This is not possible with the known method, since the positive engagement achieved thereby is not sufficient, even if two constrictions are formed as in the case of pressing as defined in DE-A-27 19 882. In the case of the first constriction effected by the sealing ring, the vertex between the two constrictions is offset radially farther inward than the inner edge of the bead shoulder, so that a positive engagement between bead shoulder and first constriction is not created. Even the fact that, in the case of pressing as defined in U.S. Pat. No. 5,007,667, the inner edge of the bead shoulder digs in results in only an inconsequential improvement in positive engagement, and entails the same disadvantages as in the case of pressing as defined in DE-C-1 187 870. This type of positive engagement between press fitting and pipe is therefore also not suitable for higher loads.

It is therefore the object of the invention to make available a method with which pipes and press fittings can be joined to one another in such a way that the joint withstands high pressures. In addition, the method is intended not to impose stringent quality demands on the pipes. A further goal is that this method be applicable to production press fittings available commercially. Lastly, it is a goal of the invention to configure a combination of press fitting, pipe, and pressing device in such a way that the method can be carried out without far-reaching modifications of the pressing device in particular. The same applies to the manner in which the pressing device itself is made available.

As far as the method is concerned, the object is achieved in that the bead shoulder is pressed into the pipe to indent a first constriction; and a second constriction is indented into the pipe by pressing the cylindrical section at a distance from the first constriction such that it is separated in its conformation from the first constriction in a manner such that the first constriction has a section which rises radially outward in the direction of the second one.

The basic idea of the invention is to improve positive engagement between the press fitting and pipe by the fact that two constrictions are indented in the pipe, at two points, by pressing the press fitting, this in accordance with two particularities of the method according to the invention. On the one hand, to form the first constriction the annular bead—and in this case principally its bead shoulder—are utilized in such a way that said constriction is indented by the annular bead itself as a result of direct contact with the pipe, forming a section which rises radially outward in the direction of the second constriction. This creates a first positive engagement between annular bead and pipe.

On the other hand, pressing in the cylindrical section takes place at a spacing from the annular bead or bead shoulder such that the result is not a single, continuously elongated constriction in the pipe, but rather two independently constrictions of independent conformation, each of which yields its own positive engagement. It has been shown that this type of clamping effect between pipe and press fitting can absorb substantially greater axial forces, so that considerably higher pressures can be applied to the pipe. Independently thereof, this type of joint no longer imposes such stringent requirements in terms of the tolerances for pipe and press fitting. It is particularly advantageous in this context that despite the improved axial strength, the open flow cross section in the pipe is decreased only slightly, and in any event much less than if an attempt had been made to attain the same axial strength with only one constriction.

In addition, standard production press fittings can be used, since the cylindrical section of such press fittings is sufficiently long that the second constriction can be made at a distance from the first, so that two independent constrictions are produced. The method according to the invention moreover requires no fundamental modification to existing pressing devices, but instead simply a corresponding adaptation of the pressing contour. It is not necessary in this context to widen the entire pressing contour, since a symmetrical pressing contour is not necessary, in particular if the safety feature as defined in DE-U-92 16 369 is provided. The pressing devices thus remain easy to handle and can also be used in confined spaces; both constrictions can be indented in one pressing operation.

The center-to-center spacing of the constrictions should be selected so that the constrictions are separated from one another in such away that each constriction generates an independent positive engagement. For this, the center-to-center spacing should correspond at least to the axial extension of the annular bead, preferably 1.5 to 2 times that extension, "axial extension" meaning an extension in the direction of the pipe axis. Advantageously, the center-to-center spacing Tg of the constrictions should satisfy the following conditions:

$$Tg \leq \frac{Te + Sf}{2} \text{ and } Tg \geq 3\sqrt{Sf^3 \times 576 \times \left(\frac{Fpmax + Fpmin}{2}\right)} - Sf,$$

where Te is the spacing between pipe end and fitting end, Sf the wall thickness of the bead shoulder, and Fpmin the minimum and Fpmax the maximum recess depth of the second constriction. To the extent possible, the spacing selected should just large enough that two independent constrictions are still created, i.e. the constrictions are immediately adjacent to one another, separated only by a vertex. It is also advantageous to indent the second constriction more deeply than the first, since this is favorable for sealing reliability.

Based on experience gained, the outside diameter of the annular bead should be reduced by 6 to 15%, and that of the cylindrical section of the press fitting by 10 to 20%. The first constriction should preferably cause the diameter of the pipe to be reduced by 4 to 15%.

These ranges have proven favorable, with standard combinations of pipe and press fitting, in terms of the configuration of the constrictions and the axial strength of the joint.

According to a further feature of the invention, provision is made for pressing to be accomplished by means of a pressing device which has at least two pressing jaws with an internal pressing contour that, for the pressing operation, are placed around the annular bead and then moved, by means of a device drive, in such a way that the press fitting and the pipe are plastically deformed radially inward, the pressing contour of the pressing jaws being such that the press fitting and pipe are deformed least in the region of the respective opposite end faces of the pressing jaws. This procedure prevents crushing of the sealing ring in particular. In detail, the pressing contour of the pressing jaws is to be such that the press fitting and pipe are deformed less toward the end faces of the pressing jaws than in the center region of the pressing jaws. If two pressing jaws are present, the pressing contour should change every 90 degrees from a point of maximum pressing to a point of minimum pressing.

For sealing in the region of the sealing ring, it is advantageous if the annular bead, in contradiction to the teaching of EP-B-0 361 630, is compressed not at all or by a maximum of 15% in the axial direction. In addition, the outer radius of the curved section of the annular bead should be reduced not at all or by only a maximum of 10% during pressing. Overall, therefore, it is desirable for the basic shape of the annular bead to remain substantially unchanged, since this results on the one hand in good sealing, and on the other hand in the formation of well-defined constrictions. It is advantageous in this context that indentation of the first constriction is accomplished by means of a blunt bead shoulder, in order to avoid strength-reducing notches. This can be achieved most easily by having the bead shoulder extend in a plane perpendicular to the pipe axis, so that its flat end face rests in planar fashion on the pipe.

As regards the combination of press fitting, pipe, and pressing device for carrying out the method described above, it is proposed, in order to achieve the corresponding object, that the pressing region for the annular bead be configured such that in the final position after pressing, the bead shoulder has dug into the pipe to shape a first constriction; and that the pressing land is at a spacing from the pressing region for the annular bead such that in the final position after pressing, a second constriction, separate in its conformation from the first constriction, is indented into the cylindrical section and the pipe at least in portions of the circumference, and the first constriction has a section which rises radially outward in the direction of the second constriction. The advantages of this mutual adaptation of pressing device, press fitting, and pipe, in particular in terms of their geometrical configuration, have already been presented in detail above in the description of the method according to the invention. For the parts of the combination, it is particularly valuable that production press fittings can be used, and that only an adjustment to the pressing contour of the pressing device is needed but not a fundamental redesign of the pressing device. It can therefore continue to be used with existing pressing devices, after replacement of the pressing jaws or of the pressing jaw elements containing the pressing jaw contour.

The pressing land should be at a clear spacing from the pressing region for the annular bead which corresponds at least to the axial extension of the pressing region, preferably amounting at least to 1.5 times that extension.

According to a further feature of the invention, it is proposed that the pressing contour of the pressing jaws be shaped such that the radius of the pressing contour is greatest toward the opposing end faces of the pressing jaws. The radius of the pressing contour should be smallest in the center region. If only two pressing jaws are provided, it is more advantageous for the radius of the pressing contour to be greatest in the region of the opposing end faces of the pressing jaws and of the center region. These features prevent crushing of the sealing ring in particular.

According to a further feature of the invention, provision is made for the pressing region for the annular bead to be configured as an annular pressing groove, which is prolonged radially inward on the side facing away from the pressing land to form a guide shoulder. This prevents the bead shoulder from deflecting as the first constriction is being indented.

It is moreover recommended, for the case in which the pressing region for the annular bead is configured as an annular pressing groove, to adapt the annular pressing groove to the outer contour of the annular bead, so that during pressing, the annular bead is deformed only slightly or not at all, and in particular in the curved section of the annular bead. The radius of the annular pressing groove should therefore correspond to the outer radius of the curved section, or at most should be 10% smaller.

In order to prevent notching of the pipe, it is advantageous for the bead shoulder to be, in known fashion, of blunt configuration on the inner rim, i.e. either rounded or (as is usual with production press fittings) flat, so that the bead shoulder rests in planar fashion against the pipe if (as is usual) it extends in a plane perpendicular to the pipe axis.

The subject of the invention is furthermore a pressing device having the features of the claims relevant to it.

Figure 1:
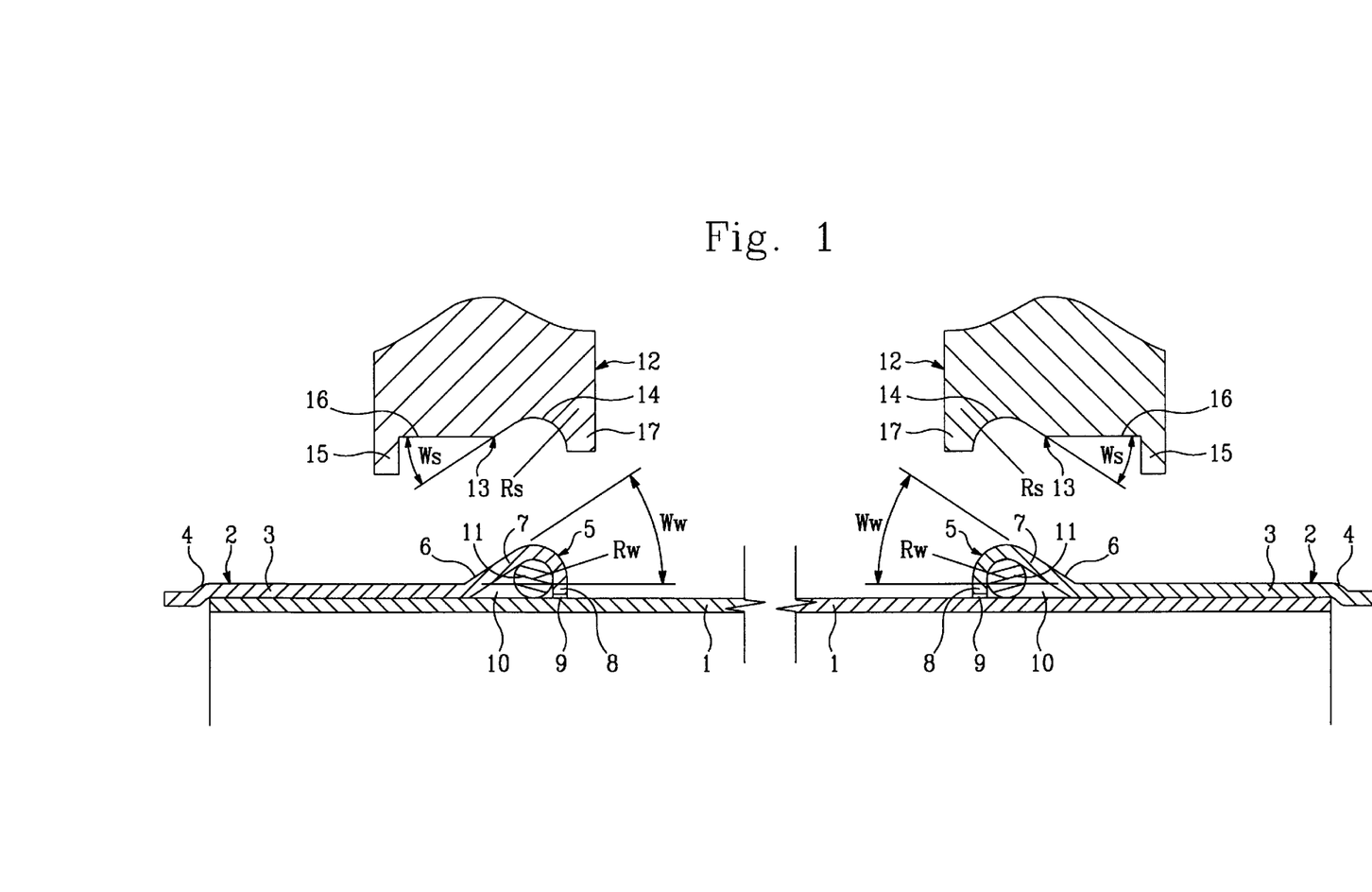
FIG. 1 shows the top half of a pipe end region and a section of a press fitting slid over it, with a pressing jaw, in the unpressed state and in longitudinal section.

The invention is illustrated in more detail, with reference to exemplifying embodiments, in the drawings, in which:

FIG. 1 depicts the end region of a pipe 1, over which a press fitting 2 has been slid a distance Te. Both are rotationally symmetrical, so that depiction of the lower half has been omitted.

Pipe 1 is of cylindrical configuration. Press fitting 2 has a cylindrical section 3 whose inside diameter is sufficiently larger than the outside diameter of pipe 1 that press fitting 2 fits even over pipes 1 that lie at the outer limit of the tolerance range for pipe 1. Toward the center, cylindrical section 3 has an inward step 4 which serves as a stop for the end of pipe 1.

Toward the open end, press fitting 2 has an annular bead 5, the conformation of which is composed of a straight bead flank 6 adjoining cylindrical section 3 and rising obliquely at an angle W, a curved section 7 proceeding from therefrom and having an outside radius Rw, and a bead shoulder 8 continuing therefrom, with wall thickness Sf. Bead shoulder 8 is oriented perpendicularly toward the outer wall of pipe 1, and ends in a flat inner rim 9 whose diameter is greater than the inside diameter of cylindrical section 3, so that a spacing exists from pipe 1. Annular bead 5 encloses an annular groove 10, open toward pipe 1, into which an elastomeric sealing ring 11, adapted in terms of cross section to the inner contour of curved section 7, is placed.

In order to join pipe 1 and press fitting 2, a pressing device as known in principle from EP-A-0 451 806 and DE-U-92 16 369.6 is applied in the region of annular bead 5. In the Figures, all that is shown of the pressing device is a sectioned portion of one pressing jaw 12. Pressing jaw 12 has on the inside a pressing contour 13 with an annular pressing groove 14 and a pressing land 15. Annular pressing groove 14 and pressing land 15 are separated by a cylindrical region 16. Pressing land 15 projects radially inward beyond cylindrical region 16. Annular pressing groove 14 extends, on the side opposite cylindrical region 16, into a guide shoulder 17 which projects radially inward beyond cylindrical region 16, but not as far as pressing land 15. The cross-sectional conformation of annular pressing groove 14 corresponds to the external shape of annular bead 5, i.e. the outer radius Rw of curved section 7 corresponds to the inner radius Rs of the curved section of annular pressing groove 14, and this section also continues, in accordance with the external shape of annular bead 5, into cylindrical region 16 at an angle Ws. Inner radius Rs can also be up to 10% smaller than outer radius R2, and angle Ws up to 10% larger than angle Ww, so that annular bead 5 is deformed during pressing, compressing sealing ring 11.

Figure 3:
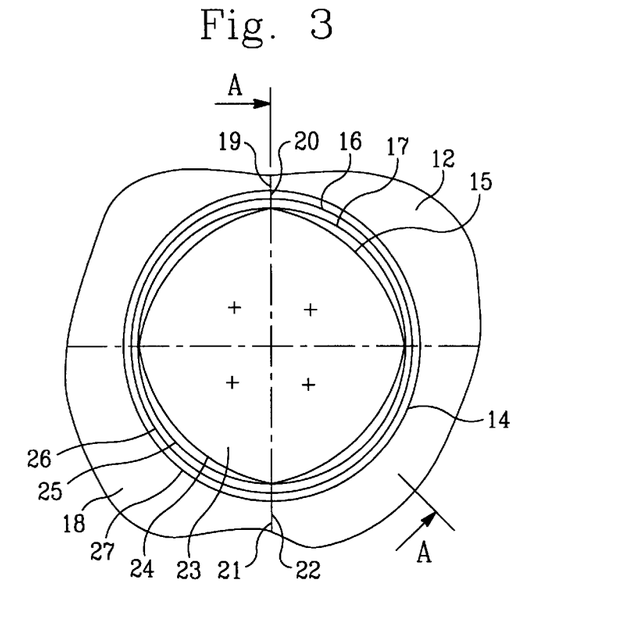
FIG. 3 shows a schematic depiction of a portion of a pressing device with two pressing jaws, in a rear view.

FIG. 3 shows the pressing jaw region of a pressing device in a rear view, including pressing jaw 12. Pressing jaw 12 extends over 180 degrees, and is located opposite a second pressing jaw 18 which is shaped in mirror-image fashion. Pressing jaws 12 and 18 rest with their opposing end faces 19, 20 and 21, 22 against one another, and in this fashion form a closed pressing space 23.

Figure 4:
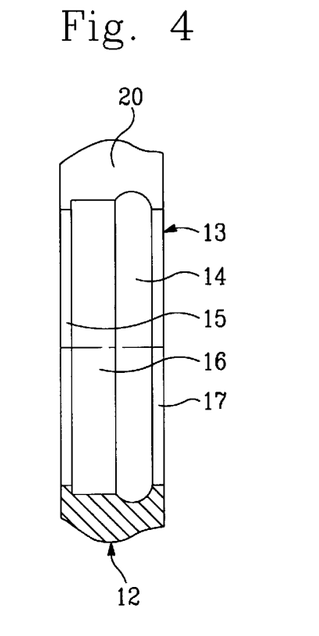
FIG. 4 shows a section through the pressing device as shown in FIG. 3, in plane A—A of FIG. 3.

FIG. 4 shows a section in plane A—A as indicated in FIG. 3. Said section shows pressing contour 13 of pressing jaw 12, at the top at end face 20 and at the bottom at a 45-degree position between a horizontal and vertical section. It is evident that pressing land 15 projects inward much less at end face 20 than in the 45-degree position, where it has its maximum radial extension. As FIG. 3 shows, the contour of pressing land 15, together with pressing land 24, extends in pressing jaw 18 so as to create a rounded rectangle (innermost solid line), such that pressing lands 15, 24 project inward the least in the regions of end faces 19, 20 and 21, 22 and in each of the regions offset by an angle of 90 degrees.

In FIG. 3, the first dashed line (counting from the inside out) shows the contour of guide shoulder 17 and of the complementary guide shoulder 25 in pressing jaw 18. The contour is circular. The second dashed line constitutes the contour of cylindrical region 16 of pressing jaw 12 and of cylindrical region 26 of pressing jaw 18. A measurement of the vertical and horizontal axes demonstrates that cylindrical regions 16, 26 are not perfectly cylindrical, but instead have a greater diameter in the region of end faces 19, 20, 21, 22 than in the regions of the horizontal plane. The same is true for the base of annular pressing groove 14, which extends into annular pressing groove 27 in pressing jaw 18. It also is not circular, but has its greatest diameter in the vertical direction, i.e. in the plane of end faces 19, 20, 21, 22, and its smallest in the horizontal plane. The advantage of this configuration is that it largely eliminates crushing of annular bead 5, which could cause excessive deformation of sealing ring 11.

Figure 2:
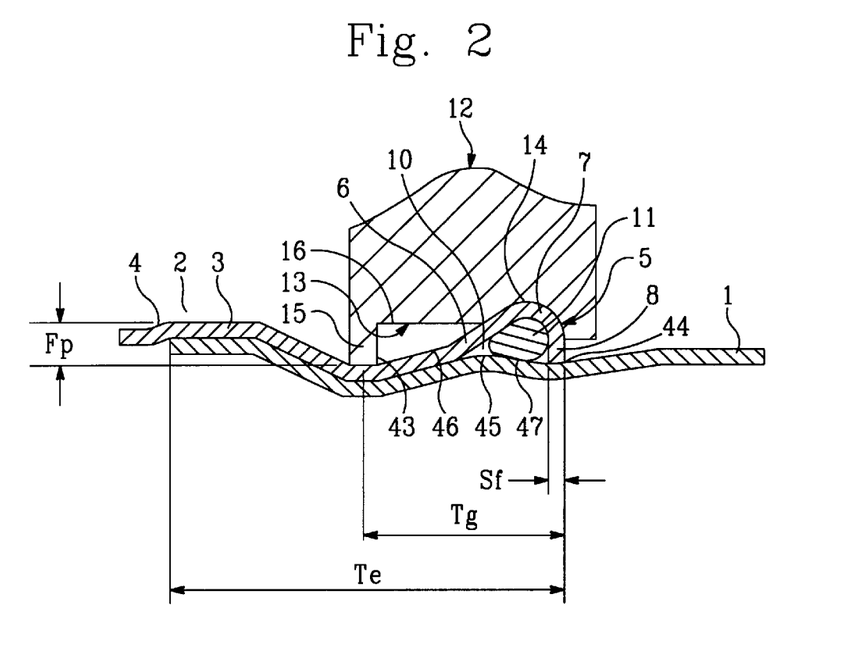
FIG. 2 shows the sectioned depiction of FIG. 1 with a pressing jaw, after pressing.
Figure 5:
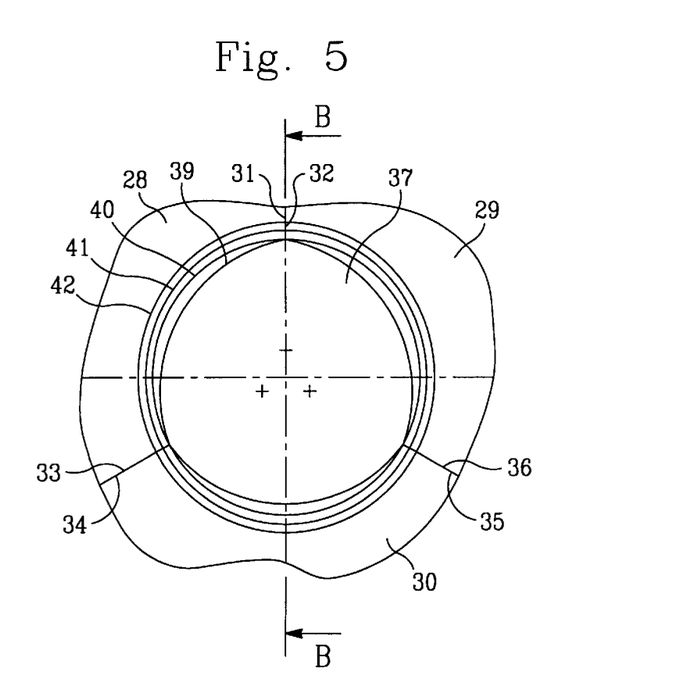
FIG. 5 shows a partial rear view of a further pressing device with three pressing jaws.
Figure 6:
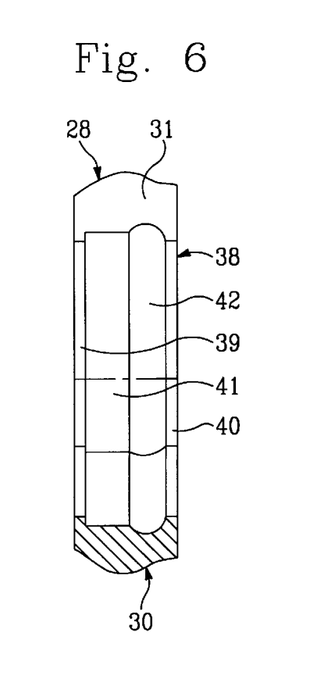
FIG. 6 shows a cross section through the pressing device as shown in FIG. 5, in plane B—B of FIG. 5.

A corresponding configuration is evident from FIGS. 5 and 6. FIG. 5 shows a pressing ring region of a pressing device having three pressing jaws 28, 29, 30, which in the position shown are resting against one another at their end faces 31, 32, 33, 34, 35, 36, and enclose a pressing space 37. Pressing contour 38 depicted in FIG. 6 is identical to that of pressing jaws 12 and 18 as shown in FIGS. 2 to 4, reference being made to the description thereof above. In FIG. 5, the innermost solid line designates the contour of pressing land 39, which is similar to a rounded triangle. Pressing land 39 has the least radial inward projection in the regions of the respective opposing end faces 31, 32 and 33, 34 and 35, 36. It has the maximum excess length in each case in the center between the regions of the opposing end faces 31, 32, and 33, 34 and 35, 36. The first dashed line (counting from the inside out) shows the profile of guide shoulder 40, which is circular. Cylindrical region 41 symbolized by the second dashed line, and the base of annular pressing groove 42 symbolized by the third dashed line, are also circular.

For the pressing operation, the particular pressing device being used—in this case the pressing device depicted in FIGS. 3 and 4—is placed with pressing jaws 12, 18 against press fitting 2 in such a way that pressing lands 15, 24 come to rest, with their farthest radially projecting regions, against cylindrical section 3 of press fitting 2, specifically in such a way that annular pressing grooves 14, 27 are located at the same level as annular bead 5. The respective adjacent pairs of end faces 19, 20 and 21, 22 are still spaced apart from one another. Subsequent thereto, pressing jaws 12, 18 are brought together radially inward by means of a corresponding drive with lever kinematics. As a result, the regions of pressing lands 15, 24 projecting the farthest radially inward dig into cylindrical section 3. A constriction 43 forms in both press fitting 2 and pipe 1, specifically at a distance Tg from the adjacent end of press fitting 2.

Approximately simultaneously, annular bead 5 makes contact inside annular pressing groove 14, 27, so that annular bead 5 is also pressed radially inward. As a result, inner rim 9 of bead shoulder 8 comes into contact against the exterior of pipe 1, and as pressing proceeds indents a constriction 44 into pipe 1 until the final state depicted in FIG. 2 is reached.

Constrictions 43, 44 are separated by a vertex 45, from which, on either side, radially inwardly oriented ramps 46, 47 proceed to the respective deepest points of constrictions 43, 44, which lie for constriction 43 in the region of pressing lands 15, 24, and for constriction 44 in the region of bead shoulder 8. Sealing ring 11 is in the process pressed flat in such a way that it rests in sealing fashion, over almost its entire circumference, both against annular groove 10 and against the exterior of pipe 1. It is particularly advantageous in this context, in terms of sealing effect, that because of the spacing between pressing land 15, 24 and bead shoulder 8, sealing ring 11 rests against a conical surface of constriction 44 which rises outward toward vertex 45, since sealing ring 11 is thereby deformed in such a way that it rests in sealing fashion against the largest possible portion of its circumference.

I claim:

1. A method for joining a pipe (1) with a press fitting (2) that has a cylindrical section (3) and, at each end, a radially outwardly projecting annular bead (5) which has, toward the free end of the press fitting (2), a bead shoulder (8) directed radially inward and on the inside forms an annular groove (10) into which a sealing ring (11) is placed, wherein the method includes sliding the press fitting (2) and pipe (1) into one another and then pressing the annular bead (5) and the cylindrical section (3) radially inwardly and thereby plastically deforming the pipe (1) and pressing the bead shoulder (8) into the pipe (1), and thus shaping a first clamping constriction (44) and a clamping second constriction (43), said second constriction being indented into the pipe by pressing the cylindrical section (3) at a distance from the first constriction (44) such that said second constriction (43) is separated in its conformation from the first constriction (44) in a manner such that the first constriction (44) has a section (47) underlying said sealing ring which rises radially outward in the direction of the second constriction.

2. The method as defined in claim 1,
wherein the constrictions (43, 44) are directly adjacent to one another.

3. The method as defined in claim 1,
wherein the center-to-center spacing of the constrictions (43, 44) corresponds at least to the axial extension of the annular bead (5).

4. The method as defined in claim 1,
wherein the center-to-center spacing (Tg) of the constrictions (43, 44) satisfies the following conditions:

$$Tg \leq \frac{Te + Sf}{2} \text{ and } Tg \geq 3\sqrt{Sf^3 \times 576 \times \left(\frac{Fpmax + Fpmin}{2}\right)} - Sf,$$

where Te is the spacing between pipe end and fitting end, Sf the wall thickness of the bead shoulder (8), and Fpmin the minimum and Fpmax the maximum recess depth of the second constriction (43).

5. The method as defined in claim 1,
wherein the second constriction (43) is indented more deeply than the first constriction (44).

6. The method as defined in claim 1,
wherein the outside diameter of the annular bead (5) is reduced by 6 to 15%.

7. The method as defined in claim 1,
wherein the outside diameter of the pipe (1) is reduced by 4 to 15% in the first constriction (44).

8. The method as defined in claim 1,
wherein the outside diameter of the cylindrical section (3) is reduced by 10 to 20%.

9. The method as defined in claim 1,
wherein pressing is accomplished by means of a pressing device which has at least two pressing jaws (12, 18, 28, 29, 30) with an internal pressing contour (13, 38) that, for the pressing operation, are placed around the annular bead (5) and then moved, by means of a device drive, in such a way that the press fitting (2) and the pipe (1) are plastically deformed radially inward, the pressing contour (13, 38) of the pressing jaws (12, 18, 28, 29, 30) being such that the press fitting (2) and pipe (1) are deformed least in the region of the respective opposite end faces (19, 20; 21, 22; 31, 32; 33, 34; 35, 36) of the pressing jaws (12, 18, 28, 29, 30).

10. The method as defined in claim 9,
wherein the pressing contour (38) of the pressing jaws (28, 29, 30) is such that the press fitting (2) and pipe (1) are deformed less toward the end faces (31, 32; 33, 34; 35, 36) of the pressing jaws (28, 29, 30) than in the center region of the pressing jaws (28, 29, 30).

11. The method as defined in claim 9,
wherein the press fitting (2) and pipe (1) are pressed by two pressing jaws (12, 18), in which the pressing contour (13) changes every 90 degrees from a point of maximum pressing to a point of minimum pressing, at least in portions of the pressing contour (13).

12. The method as defined in claim 1, wherein the annular bead (5) is compressed by a maximum of 15% in the axial direction.

13. The method as defined in claim 1, wherein the outer radius of the curved section (7) of the annular bead (5) is reduced not at all or by only a maximum of 10% during pressing.

14. The method as defined in claim 1, wherein indentation of the first constriction (44) is accomplished by means of a blunt bead shoulder (8).

15. A combination of press fitting (2) pipe (1), and pressing device, the press fitting (2) being slid over the pipe (1) and having a cylindrical section (3) and, at each end, an annular bead (5) projecting radially outward having, toward the free end, a bead shoulder (8) directed radially inward and a sealing ring (11) placed into the annular groove (10); and the pressing device having multiple pressing jaws (12, 18, 28, 29, 30) with an internal pressing contour (13, 38) which constitutes a pressing region (14, 27, 42), running in the circumferential direction, for the annular bead (5) and a pressing land (15, 24, 39) running at a distance therefrom and projecting radially inward, wherein the pressing region (14, 27, 42) for the annular bead (5) is configured such that in the final position after pressing, the bead shoulder (8) has dug into the pipe (1) to shape a first clamping constriction (44) and the pressing land is at a spacing from the pressing region (14, 27, 42) for the annular bead (5) such that, in the final position after pressing, a second clamping constriction (43), separate in its conformation from the first constriction (44), is indented into the cylindrical section (3) and the pipe (1) at least in portions of the circumference, and the first constriction (44) has a section (47)

underlying the sealing ring which rises radially outward in the direction of the second constriction (43).

16. The combination as defined in claim 15, wherein the pressing land (15, 24, 39) is at a clear spacing from the pressing region (14, 27, 42) for the annular bead (5) which corresponds at least to the axial extension of the pressing region (14, 27, 42).

17. The combination as defined in claim 15, wherein the center-to-center spacing (Tg) of the constrictions (43, 44) satisfies the following conditions:

$$Tg \leq \frac{Te + Sf}{2} \text{ and } Tg \geq 3\sqrt{Sf^3 \times 576 \times \left(\frac{Fpmax + Fpmin}{2}\right)} - Sf,$$

where Te is the spacing between pipe end and fitting end, Sf the wall thickness of the bead shoulder (8), and Fpmin the minimum and Fpmax the maximum recess depth of the second constriction (43).

18. The combination as defined in claim 15, wherein the pressing contour (13, 38) is configured so that in the final position after pressing, the second constriction (43) is indented more deeply than the first constriction (44) at least over portions of the circumference.

19. The combination as defined in claim 15, wherein the pressing contour (13, 38) is configured so that in the final position after pressing, the outside diameter of the annular bead (5) is reduced by 6 to 15%.

20. The combination as defined in claim 15, wherein the outside diameter of the pipe (1) is reduced by 4 to 15% in the first constriction (44).

21. The combination as defined in claim 15, wherein the pressing contour (13, 38) is configured so that in the final position after pressing, the outside diameter of the cylindrical section (3) of the press fitting (2) is reduced by 10 to 20%.

22. The combination as defined in claim 15, wherein the pressing contour (13, 38) of the pressing jaws (12, 18, 28, 29, 30) is shaped such that the radius of the pressing contour (13, 38) is greatest, at least in certain areas, toward the opposing end faces (19, 20; 21, 22; 31, 32; 33, 34; 35, 36) of the pressing jaws (12, 18,28,29,30).

23. The combination as defined in claim 22, wherein the pressing contour (13, 38) of the pressing jaws (12, 18, 28, 29, 30) is shaped such that the radius of the pressing contour (13, 38) is, at least partially, smallest in the center region.

24. The combination as defined in claim 22, wherein the pressing device has two pressing jaws (12, 18), and the radius of the pressing contour (13) is greatest in the regions of the respective opposing end faces (19, 20; 21, 22; 31, 32; 33, 34; 35, 36) of the pressing jaws (12, 18, 28, 29, 30) and of the center regions.

25. The combination as defined in claim 15, wherein the pressing region for the annular bead (5) is configured as an annular pressing groove (14, 27, 42), which is prolonged radially inward on the side facing away from the pressing land (15, 24, 39) to form a guide shoulder (17, 25, 40).

26. The combination as defined in claim 15, wherein the pressing region for the annular bead (5) is configured as an annular pressing groove (14, 27, 42) which is adapted to the outer contour of the annular bead (5).

27. The combination as defined in claim 26, wherein before pressing, the radius of the annular pressing groove (14, 27, 42) corresponds to the outer radius of the curved section (7) of the annular bead (5), or is a maximum of 10% smaller.

28. The combination as defined in claim 15, wherein the bead shoulder (8) is of blunt configuration on the inner rim (9).

29. A pressing device for joining a pipe (1) with a press fitting (2), the device having multiple pressing jaws (12, 18, 28, 29, 30) providing a pressing contour (13, 38) having a pressing region (14, 27, 42) running in the circumferential direction for an annular bead (5) overlying a sealing ring, a pressing land (15, 24, 39) projecting radially inward beyond said pressing region for forming a second clamping constriction and a guide shoulder (17) extending radially inwardly and terminating intermediate said pressing land and a cylindrical region forming a first clamping constriction separated from said second clamping constriction in such a manner that the first clamping constriction has a section underlying the sealing ring which rises radially outwardly in the direction of the second clamping constriction, wherein the pressing land (15, 24, 39) is at the cylindrical region from the arcuate pressing region (14, 27, 42) for the annular bead (5) which corresponds at least to the axial extension of the pressing region (14, 27, 42).

30. The pressing device as defined in claim 29, wherein the pressing region for the annular bead (5) is configured as an annular pressing groove (14, 27, 42), which is prolonged radially inward on the side facing away from the pressing land (15, 24, 39) to form a guide shoulder (17, 25, 40).

31. The pressing device as defined in claim 29, wherein the pressing contour (13, 38) of the pressing jaws (12, 18, 28, 29, 30) is shaped such that the radius of the pressing contour (13, 38) is greatest, at least in certain areas, toward the opposing end faces (19, 20; 21, 22; 31, 32; 33, 34; 35, 36) of the pressing jaws (12, 18, 28, 29, 30).

32. The pressing device as defined in claim 31, wherein the pressing contour (13, 38) of the pressing jaws (12, 18, 28, 29, 30) is shaped such that the radius of the pressing contour (13, 38) is, at least partially, smallest in the center region.

33. The pressing device as defined in claim 31, wherein the pressing device has two pressing jaws (12, 18), and the radius of the pressing contour (13) is greatest in the regions of the respective opposing end faces (19, 20; 21, 22; 31, 32; 33, 34; 35, 36) of the pressing jaws (12, 18, 28, 29, 30) and of the center regions.

34. The pressing device as defined in claim 29, wherein the pressing region for the annular bead (5) is configured as an annular pressing groove (14, 27, 42) which is adapted to the outer contour of the annular bead (5).

35. The pressing device as defined in claim 34, wherein the radius of the annular pressing groove (14, 27, 42) corresponds to the outer radius of the curved section (7) of the annular bead (5).

36. The pressing device as defined in claim 29, wherein the bead shoulder (8) is of blunt configuration on the inner rim (9).

* * * * *